United States Patent [19]

Castor et al.

[11] Patent Number: 5,590,288
[45] Date of Patent: Dec. 31, 1996

[54] DISTRIBUTED DATA PROCESSING SYSTEM AND METHOD UTILIZING PERIPHERAL DEVICE POLLING AND LAYERED COMMUNICATION SOFTWARE

[75] Inventors: Patrick F. Castor, Naperville; Yung-Chun Tsau, Oak Brook, both of Ill.; Inge B. Kristiansen, Pasadena, Calif.; John W. Nelson, Chicago, Ill.

[73] Assignee: Restaurant Technology, Inc., Oak Brook, Ill.

[21] Appl. No.: 402,810

[22] Filed: Mar. 13, 1995

Related U.S. Application Data

[63] Continuation of Ser. No. 738,084, Jul. 30, 1991, abandoned.

[51] Int. Cl.$^6$ .......................... G06F 13/37; G06F 13/372
[52] U.S. Cl. .................. 395/200.03; 395/865; 395/867; 395/727
[58] Field of Search ..................................... 395/650, 700, 395/725, 775, 200, 200.03, 865, 867, 727

[56] References Cited

U.S. PATENT DOCUMENTS

| | | | |
|---|---|---|---|
| 4,145,739 | 3/1979 | Dunning et al. | 395/800 |
| 4,428,043 | 1/1984 | Catiller et al. | 395/200.02 |
| 4,608,663 | 8/1986 | Gordon | 395/866 |
| 4,633,394 | 12/1986 | Georgiou et al. | 395/650 |
| 4,683,531 | 7/1987 | Kelch et al. | 395/289 |
| 4,862,350 | 8/1989 | Orr et al. | 395/250 |
| 4,903,200 | 2/1990 | Mook, Jr. | 364/405 |
| 4,924,461 | 5/1990 | Amemiya et al. | 370/95.2 |
| 4,947,162 | 8/1990 | Kimura | 340/825.08 |
| 5,043,982 | 8/1991 | Werner | 370/100.1 |
| 5,093,829 | 3/1992 | Maher | 370/85.8 |
| 5,123,089 | 6/1992 | Beilinski et al. | 395/200.01 |
| 5,144,692 | 9/1992 | Baker et al. | 395/650 |
| 5,218,699 | 6/1993 | Brandle et al. | 395/650 |
| 5,267,243 | 11/1993 | Sarraf | 370/95.1 |
| 5,341,499 | 8/1994 | Doragh | 395/700 |

OTHER PUBLICATIONS

Allen, Robert—Writing Device Drivers With Turbo C—*The C Users Journal*—Feb. 1989.

Erdelsky, Philip J.—How To Write Conforming MS–DOS Device Drivers In C—*The C Users Journal*—Sep./Oct. 1988.

*Primary Examiner*—William M. Treat
*Assistant Examiner*—Viet Vu
*Attorney, Agent, or Firm*—Jenner & Block

[57] ABSTRACT

A distributed data processing system is provided that is particularly well-suited for enabling a plurality of single-tasking computers connected to a network to continuously process input from the network and each computer's respective peripherals. A polling routine, resident on each computer, periodically polls the peripherals (including a network adapter) which are connected to the computer. Layered communications software is also resident on each computer and enables each computer to send and receive data to and from the network. The polling routine and layered software call predetermined application procedures in response to input from the peripherals and the network.

13 Claims, 8 Drawing Sheets

FIG. 4

PROCEDURE TABLE

| DESIGNATOR | ADDRESS |
|---|---|
| 1 | 100F0H |
| 2 | 10F20H |
| 3 | 10FF1H |
| ... | ... |
| N | 1F321H |

DISTRIBUTED DATA PROCESSING SYSTEM AND METHOD UTILIZING PERIPHERAL DEVICE POLLING AND LAYERED COMMUNICATION SOFTWARE

This application is a continuation, of application Ser. No. 07/738,084, filed Jul. 30, 1991, now abandoned.

FIELD OF THE INVENTION

This invention relates to distributed data processing, and more particularly to network communications between independent processors. The devices, systems and methods specified by this invention are especially suited for distributed processing on a network of single-task microcomputers.

BACKGROUND OF THE INVENTION

In the past, most computer processing took place on large mainframe computers. These large computers were known as multi-tasking computers because they would concurrently perform a large number of processes (or "jobs") and/or serve a large number of users. In 1971, the first commercially available microprocessors were developed by Intel Corporation. These microprocessors were considerably smaller than mainframe computers. Initially, microprocessors were operated in a single-tasking mode, meaning that they could perform only one job at a time. As new and more powerful microprocessors were developed, their use became widespread. Many of the tasks which were formerly performed by a single mainframe computer were delegated to numerous microcomputers.

In commerce and industry, the tasks performed by one microcomputer are often related to tasks performed by other microcomputers. In this case, it is often desirable or necessary for these independent microcomputers to share information and processing tasks. For example, a retail store might use five computers as cash registers and two other computers as inventory managers. Additionally, the store might have a single computer printer which is attached to one of the five computers (the "printer computer") which is used as a cash register. Such a store would find it desirable for all seven computers to share the single printer attached to the printer computer. It might also be desirable to track changes in inventory as sales are rung up on the cash register computers by having each cash register computer periodically communicate sales information to one or both of the inventory control computers.

This type of sharing and communication is typically accomplished by electronically connecting (or "networking") computers. The technology for implementing network communication is widely available. The difficulty with this technology lies in the single-tasking operation of many microcomputers. As the above example suggests, when a computer is networked to other computers, it is likely to receive requests from the other computers. For example, the printer computer might be constantly interrupted as the other computers request to use its printer. If the printer computer is a single-task machine, every time it receives a request to print from another computer, it will have to stop its own work (or "local task"), handle the print request, and then resume its local task. An operator using the printer computer for the local task would experience a delay while the computer handled the print request. This delay is sometimes referred to as a degradation in response time. As the number and complexity of the requests between computers in a network increases, single-tasking computers spend an increasing amount of time switching between local tasks and requests from remote computers. As a result response time degradates to unacceptable levels.

SUMMARY OF THE INVENTION

As used in this specification, the following terms shall have the meanings set forth below:

A "computer" includes any machine capable of processing information according to a set of instructions or rules.

"IBM compatible" includes any computer which is compatible with the IBM PC® standard, or which uses a central processor in the Intel® 8086/8088 or 80×86 families or equivalents thereof, or which uses as the operating system MS-DOS® published by Microsoft Corporation, or equivalent thereto.

An "interface adapter" includes any peripheral device which connects a computer to a communications network.

An "interrupt" is a signal generated by a peripheral device which causes one or more predetermined actions, including setting a flag and storing data in a buffer.

"Layered software" is a group of computer routines which create a communications interface between a high level application program and physical hardware. An example of layered software is: (i) an application program interface, which is accessible to an application program; (ii) a system program interface which is accessible to the application program interface; and (iii) a device control interface which is accessible to the system program interface. The purpose of layered software is to insulate application programs from the idiosyncracies of physical devices, thereby providing modularity and portability. Thus, if the physical device must be changed, software modifications may be confined to the system program interface.

"Memory" includes any medium or device for recording data. Examples of memory include dynamic random access memory ("DRAM"), static random access memory ("SRAM"), floppy diskettes and magnetic tapes. Memory includes "primary storage" and "secondary storage." Primary storage includes internal memory directly accessible by a processor. Primary storage is typically built with miniaturized electronic circuits such as DRAM chips. Secondary storage includes external memory capability provided by a peripheral such as a tape or disk drive.

A "peripheral device" includes any hardware device connected to a computer such as a monitor, printer, disk drive or interface adapter.

"Polling" includes the periodic interrogation by a computer of the peripheral devices attached to it to determine if one of the peripheral devices has made a request, and the servicing of that request.

A "procedure" is a computer routine, and includes both procedures and functions.

A "request" occurs when one device, such as a peripheral or a computer, seeks to send data to, receive data from or cause a process to occur on another device, such as a peripheral or a computer.

A "request block" is a block of data which is sent over a network from a requesting computer (the "source") to another computer (the "destination"). The request block contains data identifying the source and destination, data identifying the request, and additional data which is dependent on the particular type of request.

A "single-task processor" is a computer processor which performs one task (or "process") at a time. The Intel® 8086 and 8088 microprocessors when operating under the MS-DOS® operating system are two examples of single-task processors.

A "SRAM Disk" is a device comprised of chip-based SRAM which emulates a disk drive.

In accordance with the present invention, the deficiencies of the prior art are overcome by providing a distributed data processing system which includes a computer network and a plurality of computers connected to the network. Each computer includes a processor, memory and a plurality of peripheral devices. Polling software resident on each computer periodically polls the peripheral devices attached to that computer, and layered communication software resident on each computer enables each of the computers attached to the network to send and receive data, procedure calls and function calls. In this manner, each processor continuously processes input data from any of the peripheral devices or other computers. The layered communications software includes an application program interface for assembling and processing request blocks, a system program interface software for transmitting and receiving said request blocks through the network, and device control interface software for controlling the network.

The system also includes a plurality of predetermined computer procedures located at predetermined addresses in the memory of each computer for processing data inputted from one or more of the plurality of peripheral devices, and a table of these procedures. This table includes a plurality of records comprising a unique procedure designator and a corresponding predetermined procedure address. These procedures and the application program interface are mutually accessible, meaning that each procedure can call the application program interface, and the application program interface can look up a particular procedure designator in the procedure table and call the procedure at the corresponding procedure address. In this manner, each of the plurality of computers can request another computer to execute one of the plurality of procedures by passing to such other computer (via the layered software) the procedure designator corresponding to the specified procedure.

In one embodiment of the invention, a timer is provided for enabling the execution of particular procedures at predetermined times.

Another object of the invention is to provide the capability for one or more computers connected to a network to load each of their respective operating systems, application programs and data from a remote file server. To this end, a distributed data processing system is provided which includes a first and second computer electronically connected by a network. The first computer includes a processor, primary storage, secondary storage and layered communication software for enabling the first computer to send and receive data through the network. The second computer includes a processor, primary storage, secondary storage and layered communication software. Operating system software for controlling the operation of the first computer, along with the first computer's application software and data, is stored on the second computer's secondary storage. An installable device driver is provided for retrieving code and data from the second computer's secondary storage. This installable device driver resides on the first computer's secondary storage.

Finally, a routine is provided for loading the installable device driver into the first computer's primary storage when the first computer is initialized. In this manner, when the first computer is initialized, the installable device driver retrieves the operating system, application program and data from the second computer's secondary storage. Thus, the invention provides the capability for the first computer to operate without a disk drive. Such a microcomputer is referred to as a "diskless microcomputer". The operating system, programs and data necessary to operate the first computer are stored on the second computer, which is known as a file server.

Using diskless microcomputers increases the reliability and lowers the costs of a distributed processing system because each diskless computer does not require a disk drive or similar mass storage device. In addition, the absence of a disk drive or other removable mass storage device prevents human operators from loading, copying or modifying programs and data resident on diskless computers, other than in accordance with the application program. Finally, centralized storage of programs and data results in easier upgrades and ensures that all computers in a distributed processing system are using the same software.

BRIEF DESCRIPTION OF THE DRAWINGS

FIG. 4 is a block diagram of a procedure table in accordance with the invention;

DETAILED DESCRIPTION OF THE INVENTION

It is important to distinguish between the invention and the environment in which the invention is practiced. As will be seen, the invention is concerned with technologies for distributed data processing and communications among computers. It provides a underlying communications infrastructure, upon which system developers can build specific applications. The applications toward which the invention may be used include point-of-sale ("POS") systems, computer-integrated manufacturing, telemarketing and virtually any other business or scientific environment in which a plurality of computers are used to perform related tasks. Naturally, the specific peripherals and applications programs which are used with the invention depend on the environment in which the invention is practiced.

The preferred embodiment disclosed herein will describe peripherals and application software suitable for use in a POS system such as that disclosed in U.S. patent application Ser. No. 07/737,749, filed concurrently herewith and entitled *Data Processing System and Method For Retail Stores*, the disclosure of which is hereby incorporated by reference. The claimed invention is by no means limited to use in a POS system.

1. Hardware Configuration.

Figure 1:
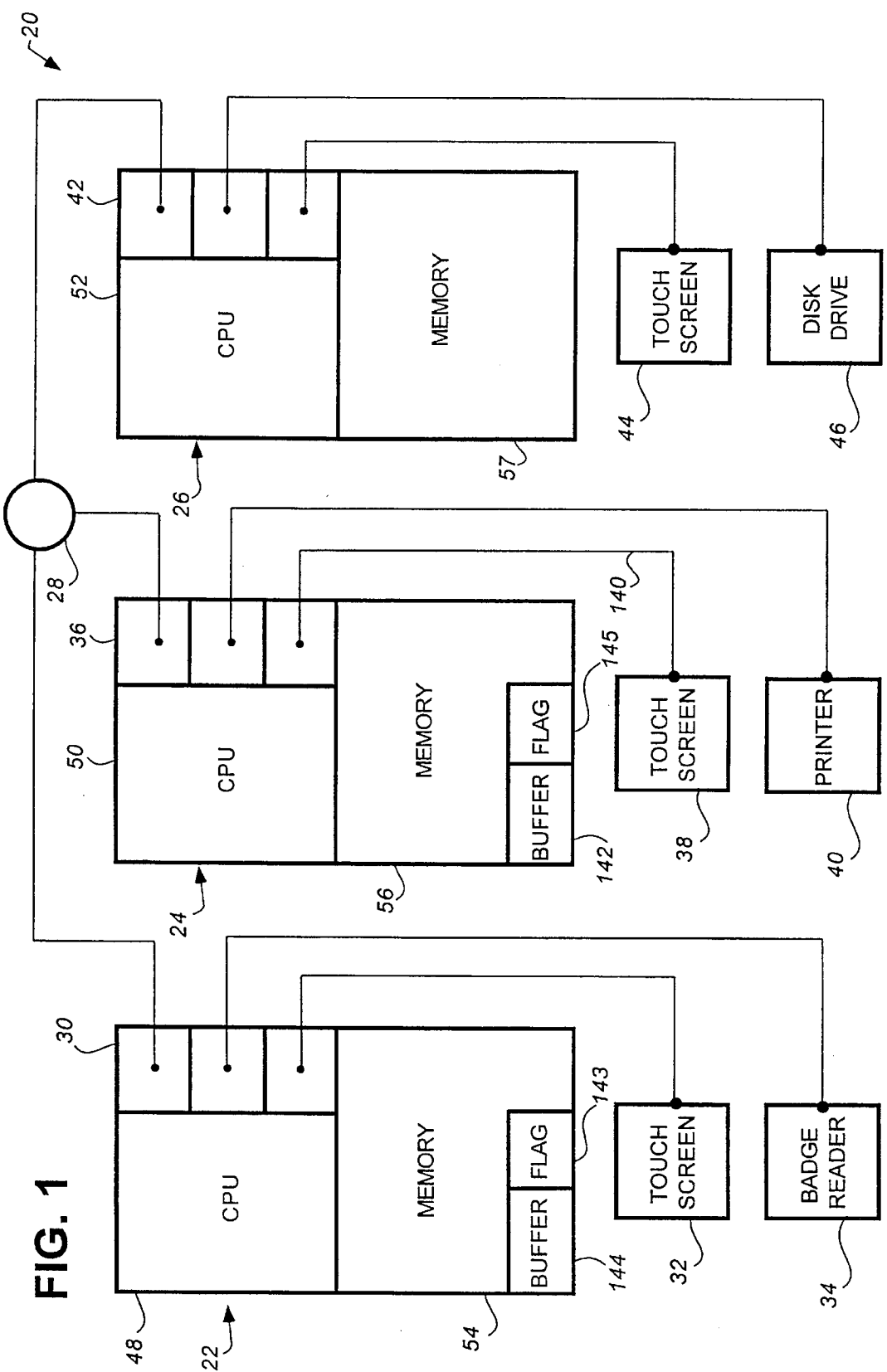
FIG. 1 is a block diagram of the hardware components of a distributed data processing system in accordance with the invention.

In FIG. 1, there is illustrated a block diagram of the hardware components of distributed data processing system 20 in accordance with the invention. Such a system is physically comprised of a plurality of computers 22, 24 and 26 electronically connected by means of network 28. For clarity, only three computers 22, 24 and 26 are shown in FIG. 1. In practice, however, additional computers may be connected to network 28.

Each computer 22, 24 and 26 has a plurality of peripheral devices, including an interface adapter for connecting each computer to network 28. Specifically, first computer 22 has an interface adapter 30, a touch screen 32 and a badge reader 34; second computer 24 has interface adapter 36, touch screen 38 and printer 40; and third computer 26 has an interface adapter 42, a touch screen 44 and a disk drive 46. Touch screens 32, 38 and 44, badge reader 34, printer 40, and disk drive 46 are widely known and available. Except for interface adapters 30, 36 and 42, the peripherals shown in FIG. 1 are mere examples. Additional and/or different peripherals could also be employed. Such peripherals could include keyboards, monitors, scanners, mice, disk and tape drivers, machine controllers, robots and other devices.

In the preferred embodiment, each computer 22, 24 and 26 is a microcomputer compatible with the IBM PC/XT® standard. Each computer 22, 24 and 26 includes central processing unit ("CPU") 48, 50 and 52, respectively, and memory 54, 56 and 58. CPUs 48, 50 and 52 are preferably Intel® 8086 microprocessors or equivalents. Memory 54, 56 and 58 may be of the conventional random access or read only types. These components are widely known and readily available and, therefore, are not described in detail. Alternatively, computers and processors from other manufacturers which adhere to other standards may be used.

In the preferred embodiment, network 28 is a commercially available local area network ("LAN") compatible with the ARCNET™ token passing LAN supplied by Datapoint Corporation. Interface adapters 30, 36 and 42 are also commercially available eight-bit ARCNET™ compatible interface cards. Alternatively, other networks and interface cards from other manufactures which adhere to other standards may be used.

2. Layered Communications Software.

The foregoing hardware components require software to function and communicate. Such software (not shown in FIG. 1) resides in memory 54, 56 and 58 of computers 22, 24 and 26, respectively. This software includes layered communications software, polling software, and interrupt software as well as applications programs. As previously stated, the present invention is a device and systems level distributed processing infrastructure. The exact nature of the applications software completely depends on the specific application toward which the invention is practiced. An example of an application is a POS system as disclosed by U.S. patent application Ser. No.07/737,749, filed concurrently herewith.

Figure 2:
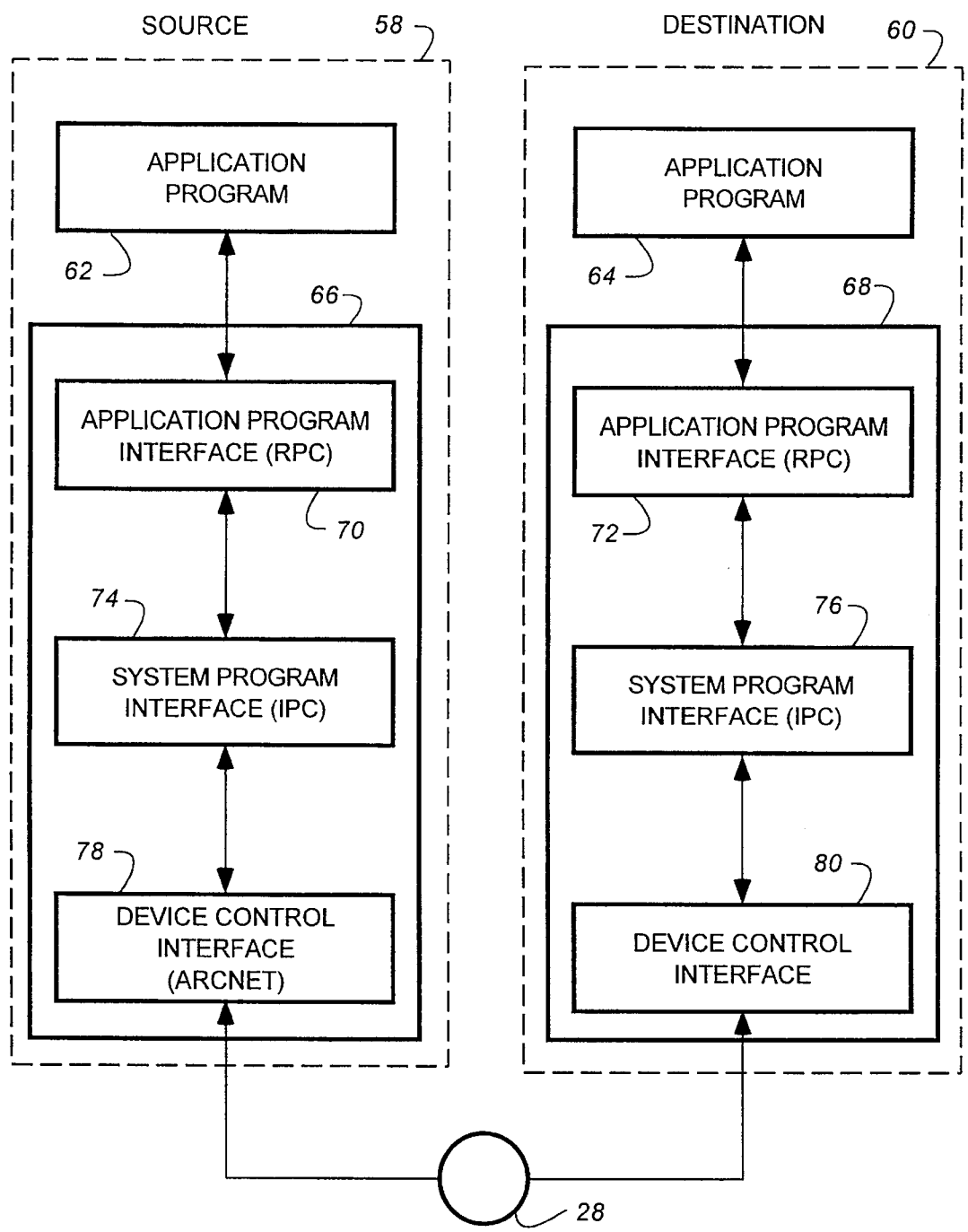
FIG. 2 is a block diagram of layered communications software for sending data through a computer network.

FIG. 2 is a block diagram of layered communications software which is executed by computers 22, 24 and 26. In the embodiment depicted by FIG. 2, the software resides on two computers, a source computer 58 and a destination computer 60, which are electronically connected by network 28. The terminology "source" and "destination" has been adopted because in the description of layered software which follows, source computer 58 sends data to destination computer 60. This designation is purely pedagogical, and destination computer 60 may in practice send data as well. Source computer 58 and destination computer 60 from FIG. 2 are only two representative computers from the plurality of computers 22, 24 and 26 depicted in FIG. 1.

Source computer 58 and destination computer 60 have resident in their respective memories application programs 62 and 64, respectively. The nature of these application programs depends on the specific environment in which the invention is practiced. In addition, source computer 58 has in memory layered software 66 and destination computer 60 has in memory layered software 68. Layered software 66 and 68 comprise application program interface software 70 and 72, system program interface software 74 and 76, and device control interface software 78 and 80, respectively. Layered software 66 and 68 will be substantially identical, differing only in implementational details relating to idiosyncracies of computers 58 and 60 and application programs 62 and 64. These implementationed details will be apparent to those skilled in the art.

Generally, when application program 62 running on source computer 58 needs a resource such as a peripheral which is not resident on source computer 58, it must send a request to destination computer 60, which for purposes of this illustration has the desired resource (not shown). Note that a resource could be a peripheral, data contained in memory, or processing ability of destination computer 60. Such a request will be transmitted by network 28. For portability and ease of programming, application program 62 relies on application program interface 70 to build and send this request. Application program interface builds a request block (not shown) which it passes to system program interface 74. System program interface modifies the request block to suit the idiosyncracies of device control interface 78, to which the request block is passed. Device control interface 78 causes the interface adapter (not shown) to electronically transmit the request block over network 28.

Generally speaking, at destination computer 60, device control interface 80 receives the request block transmitted over network 28. Device control interface 80 strips link level header data from the request block, and places the request block into a buffer (not shown) on the interface adapter card (shown as 30, 36 and 42 in FIG. 1). It is important to note that the functionality of device control interface 80 may reside in whole or in part in the logic of the interface adapter 30. Such an arrangement relieves the host computer of performing the functions of device control interface 80. The request block is then read by the system program interface 76, which copies the data to a memory location (not shown) accessible by the application program interface 68. Such a location is known as a "buffer". The application program interface 72 then calls the application program to process the request contained in the request block.

It may appear at first blush that application programs 62 and 64 could perform all the functions performed by layered software 66 and 68. In practice, however, this layered software arrangement provides portability, modularity and ease of programming. For example, the application program interface 70 is generally adapted to the idiosyncracies of the application program 62, while the device control interface 78 is adapted to the idiosyncracies of the interface adapter (not shown). Thus, application program 62 could be run on a computer utilizing a network other than network 28 by simply rewriting the system program interface software 74.

The foregoing layered software is well known in the art and can be implemented in a variety of ways. In the preferred embodiment, application program interface software 70 is implemented by a set of routines called the remote procedure call module ("RPC"). RPC conforms to the client/server paradigm. It provides application program 62 with the ability to execute functions in the destination computer 60. It is comprised of two major functions: rpc__call and rpc__handler, which are discussed below. When application program 62 in source computer 58 sends a request to destination computer 60, it uses rpc__call, which it calls with a set of parameters. Collectively, these parameters form the RPC request block 82, shown in FIG. 3.

Figure 3:
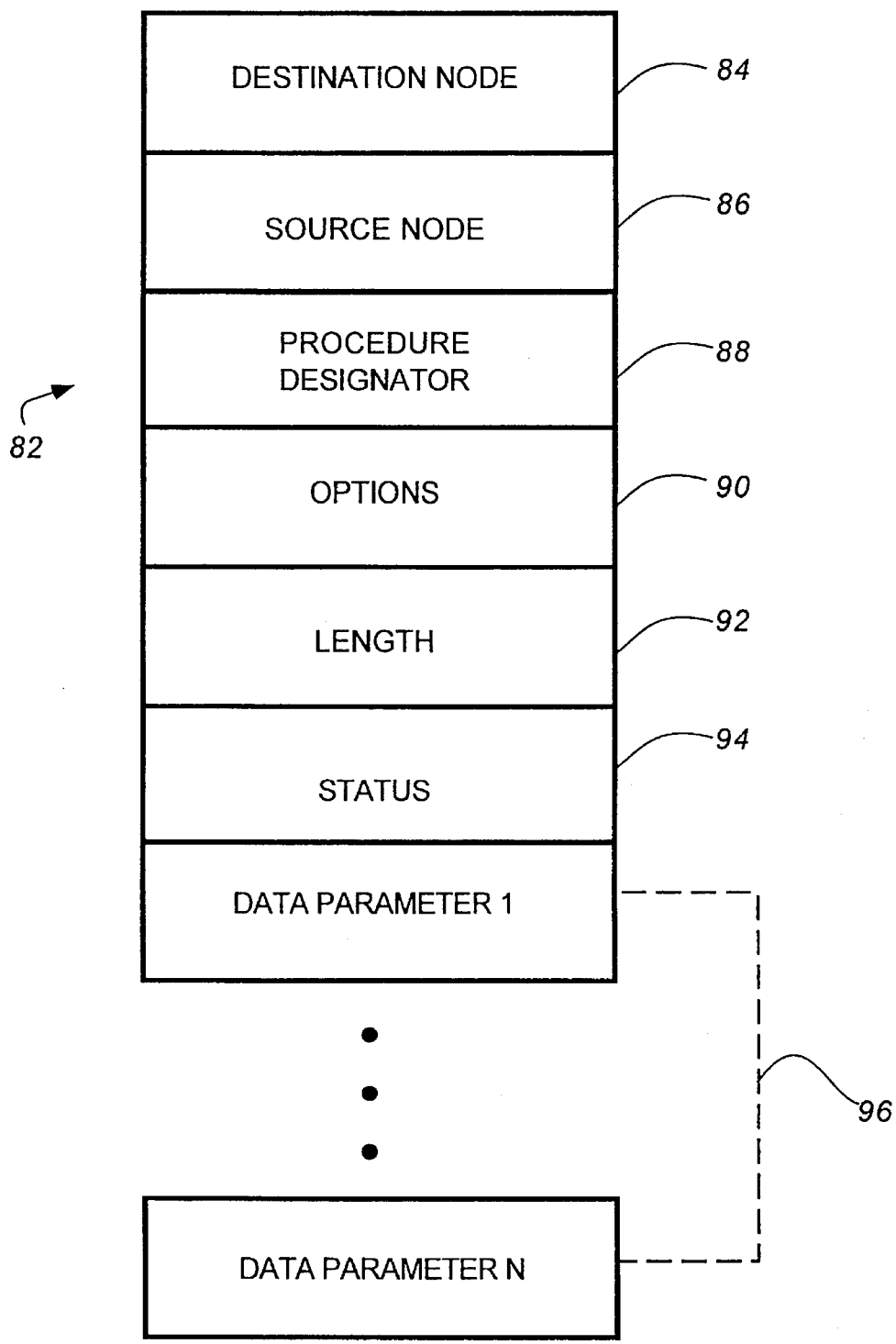
FIG. 3 is a block diagram of a request block in accordance with the invention.

As shown in FIG. 3, the parameters given to rpc__call are a Destination Node parameter 84, a Procedure Designator parameter 88, an Options parameter 90, a Length parameter 92 and a plurality of Data Parameters, collectively designated 96. Other elements of the RPC request block 82 are successively added by the system program interface 74 and device control interface 78. Destination Node parameter 84 specifies that one of the plurality of computers on network 28 to which the RPC request block 82 is sent. Procedure Designator parameter 88 specifies which procedure (the "remote procedure") the destination computer 60 is to execute. Options parameter 90 specifies how the remote procedure is to be executed. In the preferred embodiment, the Option parameter may specify the following options: (i) wait until the destination computer 60 has executed the remote procedure and returned a reply block indicating the results of the executed procedure (the "WAIT" option); (ii) wait only until the destination machine has returned a reply block indicating that it has received the RPC request block (the "DELIVER" option); and (iii) do not wait at all (the "NO WAIT" option). Length parameter 92 indicates the length of the RPC request block 82. Data parameters 96 contain data for use by the remote procedure packed together in a predetermined format. When rpc__call is invoked, Data parameters 96 are passed by specifying an address and length of a parameter block.

Rpc—call 70 in turn invokes the system program interface software 74, which in the preferred embodiment is referred to as the interprocessor communications program ("IPC"). IPC 74 also provides Status parameter 94, which in the preferred embodiment contains a number indicating the maximum data size which the remote function can return to the source computer 58. Finally, IPC 74 calls device control interface software 78, to which it passes RPC request block 82.

In the preferred embodiment, device control interface software is referred to as the ARCNET program. The ARCNET program provides a physical node address for Destination Node parameter 84 and Source Node parameter 86, and then manipulates the physical hardware of interface adapter (shown as 30, 36 and 42 in FIG. 1) to transmit the RPC request block 82 over the network 28. Data parameters 96 transmitted over the network comprise the actual data (as opposed to a mere address, as is the case when the RPC request block 82 is initially assembled by rpc__call).

At destination computer 60, device control interface 80 (also referred to as ARCNET program) strips the RPC request block 82 of network link level header and places the remaining data in a buffer which may be either in the destination computer's memory or interface adapter card (not shown). A polling routine, described below, calls system program interface 76 (also referred to as IPC). IPC 76 reads the RPC request block 82 in the interface adapter card buffer (not shown) and calls rpc__handler (part of application program interface 72). Rpc—handler causes the execution of the remote function, as described below. Upon execution of the remote function, Rpc—handler returns a reply block (substantially similar to the RPC request block), in which Status parameter 94 contains a status code, and Data parameters 96 contains predetermined types of data to be returned to source computer 58.

3. Procedure Table.

In the preferred embodiment, application programs 62 and 64 each consists of separate procedures. In accordance with one aspect of the invention, one or more of these procedures are each associated with a unique predetermined procedure designation which may be a number, letter, name or other symbol. Each procedure resides in memory at a predetermined location (or address).

In accordance with the invention, each computer 22, 24 and 26 has a procedure table such as procedure table 98, a block diagram of which is shown in FIG. 4. As indicated, procedure table 98 is comprised of a plurality of rows (or "records") 100a through 100n, each row including a unique procedure designator in column 102 and a corresponding procedure address in column 104. Preferably, each procedure designator is merely the offset in memory where its respective row resides (as opposed to a distinct field within the row), and procedure address is the starting address location in memory for the procedure designated by procedure designator. Alternatively, procedure designator can be a data element contained in a district field in each procedure table record.

Preferably, a version of procedure table 98 resides in each of computers 22, 24 and 26 shown in FIG. 1. The procedure designators in column 102 and procedure addresses in column 104 may vary from computer to computer because each of computers 22, 24 and 26 may run different applications or may have different memory configurations.

Of importance is the interface between procedure table 98 and the layered software 66 and 68 discussed above. As indicated, the procedures which are listed in procedure table 98 constitute application program 62, and, therefore, call and are called by application program interface 70. The RPC request block 82 contains a parameter 88 for a procedure designator. In this manner, application program 62 on source computer 58 can cause the execution of a desired procedure on destination computer 60 by passing the predetermined procedure designator in parameter 88 which corresponds (in the destination computer's 60 procedure table 98) to the desired procedure.

This functionality is illustrated by reconsidering the rpc__handler function discussed briefly above in connection with layered software 66 and 68. As described, source computer 58 sends an RPC request block 82 via network 28 to destination computer 60. At destination computer 60, this RPC request block 82 is passed from device control interface 80 to system program interface 76, which calls application program interface 72 (specifically, rpc__handler).

Rpc—handler uses the procedure designator specified by Procedure Designator parameter 88 in RPC request block 82 to look up a procedure address in procedure table 98, a copy of which is resident in destination computer 60. Rpc—handler then calls the indicated procedure address. Rpc—handler also examines the contents of Options parameter 90. If the NO WAIT option is indicated, no reply block is sent to source computer 58. If the DELIVER option is indicated, rpc__handler sends a reply block to source computer 58 before invoking the designated procedure. In this case, Status parameter 94 simply contains an acknowledgement that the RPC request block was received and processed. If the WAIT option is specified, rpc__handler invokes the designated procedure and, upon completion of the designated procedure, sends a reply block. In this case, Status field 94 contains the status data returned by the designated procedure.

4. Polling Routine.

Figure 5:
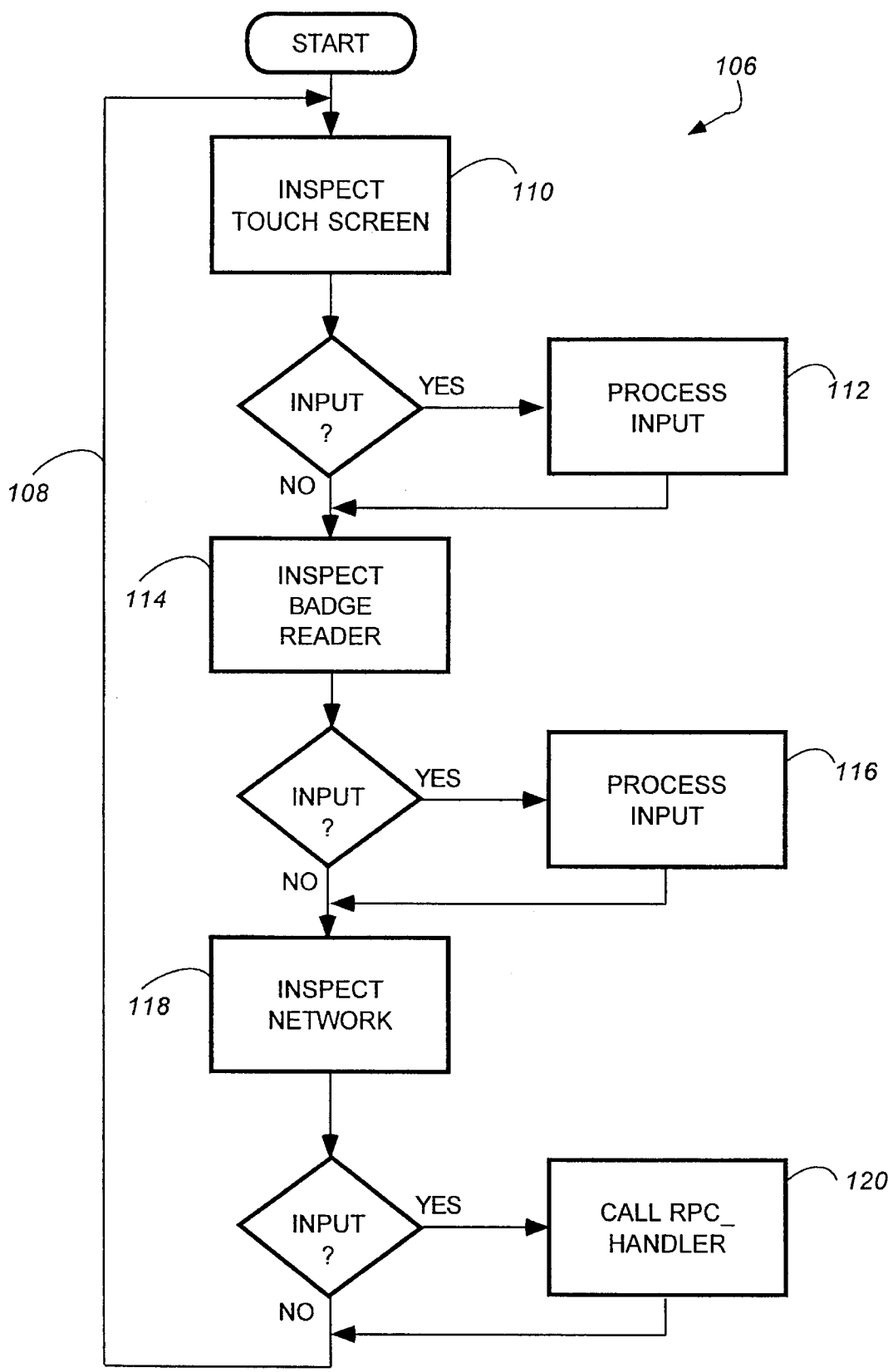
FIG. 5 is a logic flow chart of a computer routine for polling peripheral devices.

As specified, each of computers 22, 24 and 26 executes polling routine 106, a logic flowchart of which is provided in FIG. 5. As discussed above, the application program is comprised of procedures which are set forth in procedure table 98. Polling routine 106 is the central software routine which drives each of computers 22, 24 and 26 attached to network 28. It allows these computers to function as true distributed processors even though one or more of processors 48, 50 and 52 may be only single-tasking. Generally, polling routine 106 is a do-forever loop which successively polls peripheral devices which are attached to its host computer. For example, polling routine 106 resident in computer 22 polls peripheral devices 30, 32 and 34. Alternatively, polling routine 106 can poll other devices such as a cash drawer or timer.

Each peripheral device corresponds to an input-driven process which is given control of the processor for a period of time if and when its corresponding peripheral has input. For purposes of illustration, suppose polling routine 106 is running on computer 22. In the preferred embodiment, the polling routine would be running on each computer attached to network 28. Upon initialization of computer 22, control of processor 48 is given to polling routine 106, which goes into do-forever loop 108 as shown in FIG. 5. At block 110, polling routine 106 inspects touch screen 32 for input data. If input data is available, it is processed in block 112. Although not shown, this processing involves calling one of the procedures which constitute application program 62. Next, at block 114 the polling routine checks badge reader 34 for input. If input is available, it is processed at block 116. Finally, at block 118 polling routine 106 checks the interface adapter 30 for input from network 28. If input data is available, it is processed by calling rpc_handler at block 120. Upon return from rpc_handler, control returns to block 110, and the foregoing polling process is repeated.

Of importance is the interaction between polling routine 106, procedure table 98 and layered communication software 66 described above. In the preferred embodiment, polling routine 106, procedure table 98 and layered software 66 are all resident on computers 22, 24 and 26. As indicated in the preceding paragraph, polling routine 106 at block 118 checks the interface adapter 30 for input from network 28. It will be recalled that when RPC request/reply block 82 is received by the ARCNET program (shown in FIG. 2 as device control interface 78), it strips the RPC request block of network link level header and places the remaining data in a buffer (not shown) on interface adapter card 30 (or, alternatively, in memory 54). When polling routine 106 inspects the network at block 118, it calls IPC (shown as system program interface 74 in FIG. 2), which determines if data is waiting in the interface adopter card 30. If data is available, IPC calls RPC (shown as application program interface 66 in FIG. 2). Specifically, IPC calls rpc_handler as described above. Rpc—handler calls the procedure indicated by Procedure Designator parameter 88 in RPC request block 82, as described above.

As input is being processed in blocks 112, 116 and 120, procedures which are resident on other computers 22, 24 and 26 may be required. For example, suppose computer 22 is running polling routine 106 as described above. At block 110, the polling routine inspects touch screen 32, and finds that input from the touch screen is waiting for processing. In accordance with polling routine 106, control moves to block 112 where the input is processed by calling that one of the application program's 62 procedures which processes input from touch screen 32, (the "local procedure"). Suppose, however, that the input is a request to print a document on printer 90, which is attached to computer 24. Fulfillment of this request requires execution of a printing procedure on computer 24. To accomplish this, the local procedure will call (from block 112) the rpc_call routine, discussed above. Rpc—call will build and transmit an RPC request block 82, in which the Procedure Designator parameter 88 will contain the procedure designator which corresponds to the printing routine (not shown) resident on computer 24. Polling routine 106 running on computer 24 will detect and process this RPC request block 82 when it inspects its own interface adapter 36 in the same manner as described in the preceding paragraph.

There are two features of the invention which should be noted. First, in the preferred embodiment, polling routine 106 inspects a peripheral by calling device driver routines which are capable of manipulating the peripheral's hardware. These device driver routines are well known in the art. Second, as indicated above, application procedures are called by polling loop 106 at blocks 112 and 116, and by Rpc—handler at block 120. The form, function and content of these procedures depend on the particular environment in which the invention is practiced. Collectively, these procedures are referred to as application program 62 in FIG. 2. As described above, upon completion of a particular procedure, control ultimately returns to polling routine 106. Therefore, the invention will work best when application program procedures are designed to perform short, discrete functions so that control will quickly return to polling routine 106, preferably within one second. This enables polling routine 106 to continue servicing other peripheral devices without unacceptable delay. Preferably, polling routine 106, procedure table 98, layered software 66, and application program procedures 62 are all loaded during operation in the respective primary memories of host computers 22, 24 and 26.

5. Interrupt Routines

Figure 6:
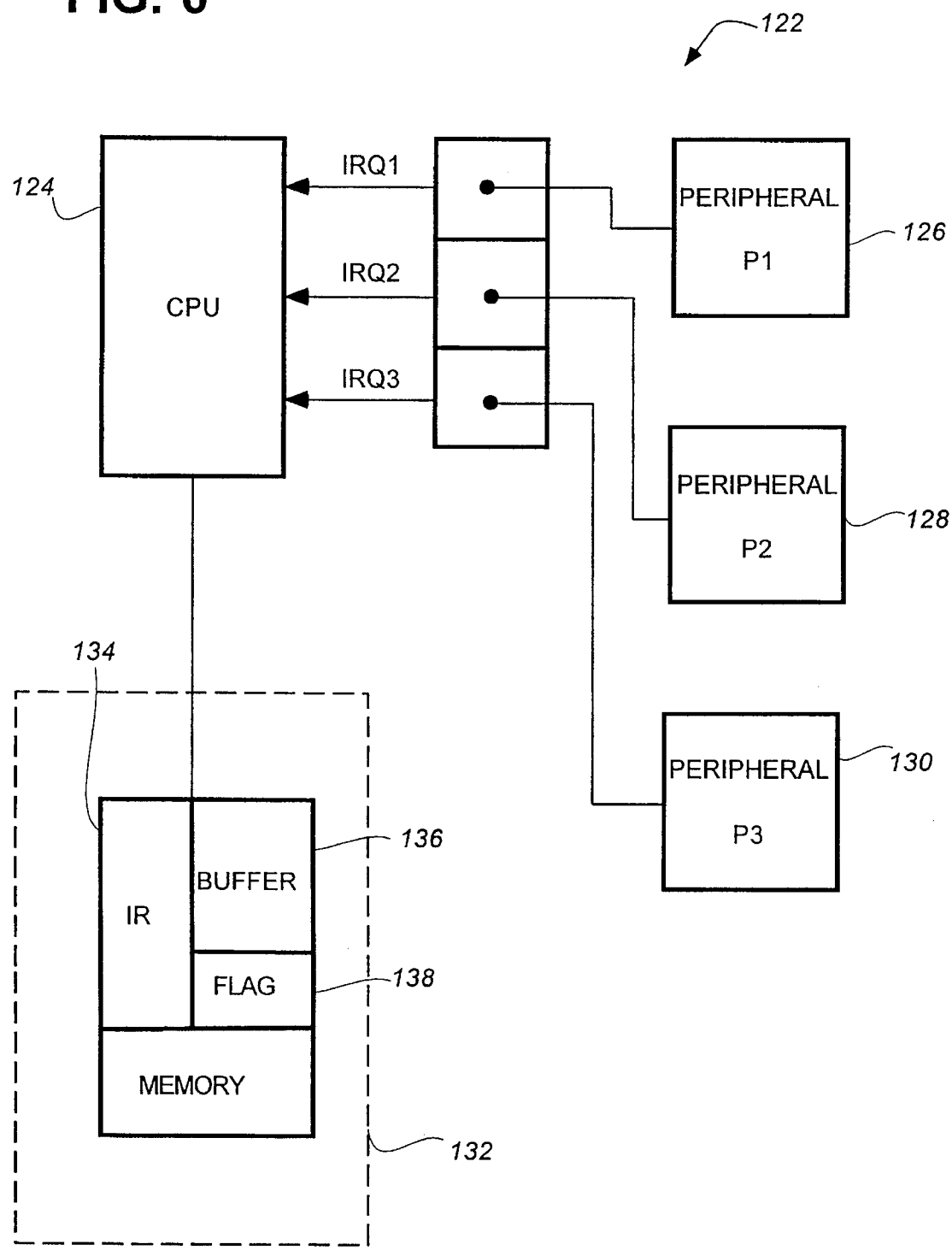
FIG. 6 is a block diagram of a peripheral device hardware interrupt.

In accordance with the invention, polling routine 106 relies on hardware interrupts generated by peripherals. FIG. 6 illustrates such an arrangement. Computer 122 includes processor 124, peripheral devices 126, 128 and 130 and memory 132, in which resides an interrupt handler 134, a buffer 136, a flag 138 and polling routine 106 (not shown). When one of peripheral devices 126, 128 or 130 requires service from processor 124, it generates that one of interrupt signals IRQ1, IRQ2 and IRQ3 with which it corresponds, as shown in FIG. 6.

By techniques well-known in the art, interrupt signals IRQ1, IRQ2 and IRQ3 suspend polling routine 106 and cause interrupt handler 134 to be invoked. In the preferred embodiment, interrupt handler 134 temporarily suspends the operation of polling routine 106 and sets flag 138 to inform polling routine 106 that a particular peripheral requires service. If data is available on that one of peripheral devices 126, 128 and 130 which generated the interrupt, then interrupt handler 134 will place such data into buffer 136. In some embodiments, buffer 136 and flag 138 may be located in an adapter card or other memory which is not the primary memory of computer 122. In the preferred embodiment, each of peripheral devices 126, 128 and 130 has a dedicated flag 138 and buffer 136.

Interrupt handler, buffer and flags such as interrupt handler 134, buffer 136 and flag 138 are resident on each of computers 22, 24 and 26 connected to network 28. For example, referring to computer 22 shown in FIG. 1, when data is received by interface adapter 30 over network 28, an interrupt is generated which causes an interrupt handler to be invoked. The interrupt handler places incoming data into a buffer 144 and sets flag 143 to inform the polling routine 106 that incoming data is waiting. Alternatively, buffer 144 and flag 143 may be on interface adapter 30.

Various implementations of the foregoing generalized arrangement are possible and often desirable. For example, interface adapter 30 can include hardware for storing incoming data and setting a flag in memory on interface card 30. In this manner, processing in computer 22 need not be interrupted. In effect, the interrupt is handled by the circuitry of interface adapter card 30, or, stated differently, a portion of the device control interface 78 functionality is delegated to the interface adapter 30. Additionally, standard features of operating systems, such as MS-DOS®, can be used to handle interrupts without specialized programming. Thus, badge reader 34 may be interfaced to processor 48 by a keyboard port (not shown). Under this arrangement, the MS-DOS® operating system treats badge reader input as keyboard input, storing it in the keyboard buffer (not shown) and setting the keyboard flag (not shown).

In accordance with another aspect of the invention, each computer 22, 24 and 26 includes a timer (not shown). The function of a timer is to generate interrupts at periodic intervals which can be used to initiate processes at specific times. For example, a timer attached to computer 22 is served by a table or task queue in memory 54, which comprises a list of procedure addresses and specific times at which such procedures should be called. The timer would then generate periodic interrupt signals, preferably once every second. Interrupt handler 134 servicing these interrupts inspects the queue to determine if a process should be presently executed. If such a process exists, then flag 143 is set so that polling routine 106 services the process when it inspects the timer peripheral. Thus, polling routine 106 services the timer as if it were another peripheral device, even though in practice the timer is usually a component of processor 48. If polling routine 106 finds that a flag has been set, it calls the indicated procedure address.

6. Example

Referring to FIG. 1, the following example is provided to illustrate one possible application of the preferred embodiment. In the preferred embodiment, polling routine 106, layered software communications software 66, interrupt handlers such as interrupt handler 134, and procedure tables such as procedure table 98 are resident on each of computers 22, 24 and 26 attached to network 28. Each of computers 22, 24 and 26 also runs an application program comprising a series of procedures which, for purposes of this example, enables each of computers 22, 24 and 26 to function as a distributed processing POS system in which sales orders are entered by means of touch screens 32, 38 and 44. In such a system, it is desirable to have a human operator gain access (or "log-on") to one of computers 22, 24 and 26 by passing an identification badge through badge reader 34 and then entering a secret password into that one of computers 22, 24 and 26 to which such human operator desires to log on. If a human operator desired access on computer 24, he or she would press an appropriate button displayed on touch screen 38.

In accordance with the invention, upon contact with the human operator, touch screen 38 generates hardware interrupt 140, which causes the touch screen interrupt routine to set a flag 145 and place touch screen data into buffer 142. This data remains in buffer 142 while polling routine 106 successively inspects peripherals 36, 38 and 40. When polling routine 106 inspects touch screen 38, the condition of flag 145 indicates that data is waiting in buffer 142. In accordance with the foregoing description, polling routine 106 processes the waiting data.

In processing this data, polling routine 106 calls one or more of the plurality of procedures resident on computer 24 which make up application program 62. The nature of these application procedures depends entirely on the environment in which the invention is practiced. They are, however, preferably resident in primary memory with polling routine 106. For the sake of illustration, it is assumed that the procedures called by polling routine 106 determine from the data inputed from touch screen 38 that the human operator has requested to log-on, and that this log-on procedure requires the human operator to place an identification badge into badge reader 34 attached to computer 22. Because the badge reader is attached to computer 22, the application program 62 on computer 24 must cause computer 22 to execute a procedure to read badge reader 4. For clarity, reference is made to FIG. 2. In the foregoing transaction, computer 24 acts as a source computer, such as source computer 58 and computer 22 acts as a destination computer such as destination computer 60.

In accordance with the invention, computer 24 invokes rpc_call, as discussed in detail above. Rpc—call assembles RPC request block 82 with procedure designator parameter 88 containing a procedure designator corresponding to that procedure in computer 22 which causes computer 22 to read badge reader 34. Options parameter 90 is preferably set to the WAIT option. The RPC request block 82 thus formatted is transmitted to computer 22 via network 28, as described above.

At computer 22, the incoming RPC request block causes interface adapter 30 to generate an interrupt signal (not shown), which causes the interface adapter to set a flag (not shown) and place the RPC request block 82 into a buffer (not shown). The flag and buffer are located on interface adapter card 30, which has processing capabilities for "handling" network interrupts. This data remains in the buffer while polling routine 106 successively inspects peripherals 30, 32 and 34. When polling routine 106 inspects interface adapter 30, the condition of the flag indicates that data is waiting in the buffer. As described, polling routine 106 calls IPC, which calls rpc_handler. RPC—handler calls the badge reading procedure corresponding to the procedure designator specified in RPC request block 82. Preferably, the badge reading procedure reserves badge reader 34 for requesting computer 24, and returns an RPC reply block to requesting computer 24 indicating that badge reader 34 had been reserved. At this point, control in computer 22 returns to polling routine 106, which resumes polling peripherals 30, 32 and 34.

At computer 24, the RPC reply block 82 is received and passed back to the originating rpc_call function, which returns the status (i.e., that badge reader 34 has been reserved) to the calling application procedure. Control in computer 24 returns to the polling routine 106 which resumes polling peripherals 36, 38 and 40. Because the WAIT option is specified in rpc_call, control over processor 50 has remained with rpc_call until computer 22 returned Rpc reply block 82.

Back at computer 22, the human operator, after some period of time, places his or her badge in badge reader 34, causing badge reader 34 to generate an interrupt, which in turn invokes the badge reader interrupt handler routine which sets flag 143 and places the badge data into buffer 144. As stated, this interrupt processing can be accomplished by using standard MS-DOS® facilities, such as the keyboard interface. This data remains in the buffer while polling routine 106 successively inspects peripherals 30, 32 and 34. When polling routine 106 inspects badge reader 34, the condition of flag 143 indicates that data is waiting in buffer.

In accordance with the foregoing description, polling routine 106 processes the badge data.

In processing this data, polling routine 106 calls one or more of the plurality of procedures resident on computer 22 which make up application program 64. The nature of these application procedures depends entirely on the environment in which the invention is practiced. For the sake of illustration, it is assumed that the procedures called by polling routine 106 determine that badge reader 34 has been reserved for computer 24. The badge reader data in buffer 144 is sent to computer 24 through network 28 by means of rpc_call, the badge reader is made available to other computers, and control returns to polling routine 106.

It will be observed that in the foregoing paragraph, the roles of computers 22 and 24 have been reversed, in that computer 22 now corresponds to source computer 58 because it is sending data to computer 24, which now corresponds to destination computer 60.

At computer 24, incoming RPC request block 82 from computer 22 causes interface adapter 36 to place RPC request block 82 into a buffer (not shown) and set a flag (not shown), both of which buffer and flag are on interface adapter 36. This data remains in buffer 142 while polling routine 106 successively inspects peripherals 36, 38 and 40. When polling routine 106 inspects interface adapter 36, the condition its flag indicates that data is waiting in its buffer. In accordance with the foregoing description, polling routine 106 calls IPC, which calls rpc_handler. Rpc-handler calls a procedure to process badge reader data, such procedure corresponding to the procedure designator in RPC request block 82. At this point, control in computer 24 returns to the polling routine, which resumes polling peripherals 36, 38 and 40.

7. Remote Virtual Disk.

In accordance with another aspect of the invention, each of computers 22, 24 and 26 shares via network 28 disk drive 46, which is attached to computer 26. Disk drive 46 contains operating system programming application programs and applications data used by each of computers 22, 24 and 26. Computer 26 is referred to as the "remote file server", and computers 22 and 24 are referred to as "local computers". The designation of computer 26 to be the remote file server is arbitrary. Either computer 22 or 24 could function as the remote file servers if disk drive 46 were attached to it.

Of importance is the manner in which each of local computers 22 and 24 load their respective operating systems from disk drive 46 when they are initialized (or "booted-up"). This is accomplished by means of a remote virtual disk system, a block diagram of which is provided in FIG. 7. The operation of remote virtual disk is shown with respect to a remote file server 148 which is connected via network 150 to local computer 152. The remote virtual disk is implemented by as device driver 154 ("RVDISK") resident on local computer 52.

RVDISK may be implemented on other computers such as computer 155 attached to network 150. In the embodiment depicted in FIG. 1, computer 26 functions in the same manner as remote file server 148, and computers 22 and 24 each function in the same manner as local computer 152.

In the preferred embodiment, remote file server 148 is IBM compatible and runs under the MS-DOS® operating system. For purposes of illustration, it is assumed that remote file server is initialized and running. Layered software RPC 158, IPC 160 and ARCNET 162 are loaded into remote file server's 148 main memory 164, along with operating system 156. Each of these programs has been described in detail. Secondary storage device 166 is attached to remote file server 148, and is preferably a hard disk drive.

Local computer 152 is preferably an IBM or compatible with primary memory 168 and secondary memory 170. Preferably, secondary memory 170 is a SRAM drive. Secondary memory 170 could also be a disk drive. However, attaching a disk drive to local computer 152 reduces the need for and usefulness of a remote virtual disk drive. RVDISK 154, IPC 172 and ARCNET 174, along with the CONFIG.SYS file (not shown) are resident in secondary memory 170 when local computer 152 is powered off. As discussed below, when local computer 152 is turned on or otherwise initialized, RVDISK 154, IPC 172 and ARCNET 174 are loaded into primary memory 168, along with the core portion of the MS-DOS® operating system 176. This core portion comprises the MS-DOS® operating system in its entirety, less the COMMAND.COM program. Specifically, it includes the files IBMBIO.COM and IBMDOS.COM. When the local computer 152 is shut off, the core portion of MS-DOS® resides in secondary storage 170 and BIOS ROM (not shown) in accordance with standard IBM PC® architecture.

With respect to both remote file server 148 and local computer 152, RPC 158, IPC 172 and 160 and ARCNET 174 and 162 are described above in connection with FIG. 2.

RVDISK 154 is an installable device driver. In microcomputers which run the MS-DOS® operating system, installable device drivers are interfaced to the hardware independent kernel through a clearly defined scheme of function codes and data structures. Device drivers come in two classes, (i) block-device drivers, and (ii) character device drivers. Character-device drivers control peripheral devices that perform input and output one character or byte at a time. Examples of character-device drivers are terminals and printers. Block-device drivers usually control random-access mass storage devices such as floppy-disk drives and fixed-disk drives. Block devices transfer data in multiple blocks of bytes, rather than in single characters. Block devices are assigned logical names by MS-DOS® operating system 176 starting with the letter "A." MS-DOS®installable device drivers are not linked to the operating system. Instead, when the microcomputer first loads the MS-DOS® operating system 177, the device driver RVDISK 154 is loaded by a line in the CONFIG.SYS file (not shown) in the form:

DEVICE=filespec[arguments].

RVDISK device driver 154 is a block-device driver which is also known as a logical device. RVDISK 154 is built on the concept of a virtual disk block device driver but with some variations. A typical virtual disk block device driver provides an additional virtual disk drive which consists of a portion of the computer's main memory, as opposed to an actual disk drive. The purpose of a virtual disk is to provide a logical device which behaves exactly like a disk drive, but because it resides in memory has superior performance. The virtual disk drive will set up a file system with the boot block which contains the BIOS parameter block (the "BPB"), file allocation table (the "FAT"), root directory and file area. The virtual disk can be made to emulate a hard disk or a floppy disk of any size (restricted by available memory). A virtual disk program must set up a BPB which contains all of the parameters necessary to characterize a disk storage device.

RVDISK technology differs from a virtual disk in two major respects. First, instead of creating its own file system, remote virtual disk device driver 154 copies an existing BPB from file server's 148 secondary storage device 166. MS-DOS® operating system 176 uses this copy of the BPB to form its requests for data. For example, MS-DOS® operating system 176 uses the copied BPB to determine the location and size of FAT and the size of data sectors. Second, RVDISK technology retrieves data from secondary storage device 166 and not from a virtual disk set up in the memory of local computer 152.

RVDISK device driver 154 is an installable device driver which comports to the predetermined requirement of MS-DOS®. The structure of RVDISK device driver 154 is set forth in FIG. 8. RVDISK driver 154 is comprised of a device header 178, a strategy routine 180, an interrupt routine 182, an initialization routine 184, a media check routine 186, a build BPB routine 188, a read routine 190 and a support routine 192. Persons skilled in the art will recognize that programming techniques for implementing the foregoing routines are well known, and the present invention embraces the use of any available technique. RVDISK also includes IPC 172 and ARCNET 174, which, for clarity, are shown as separate components in FIG. 7.

Figure 7:
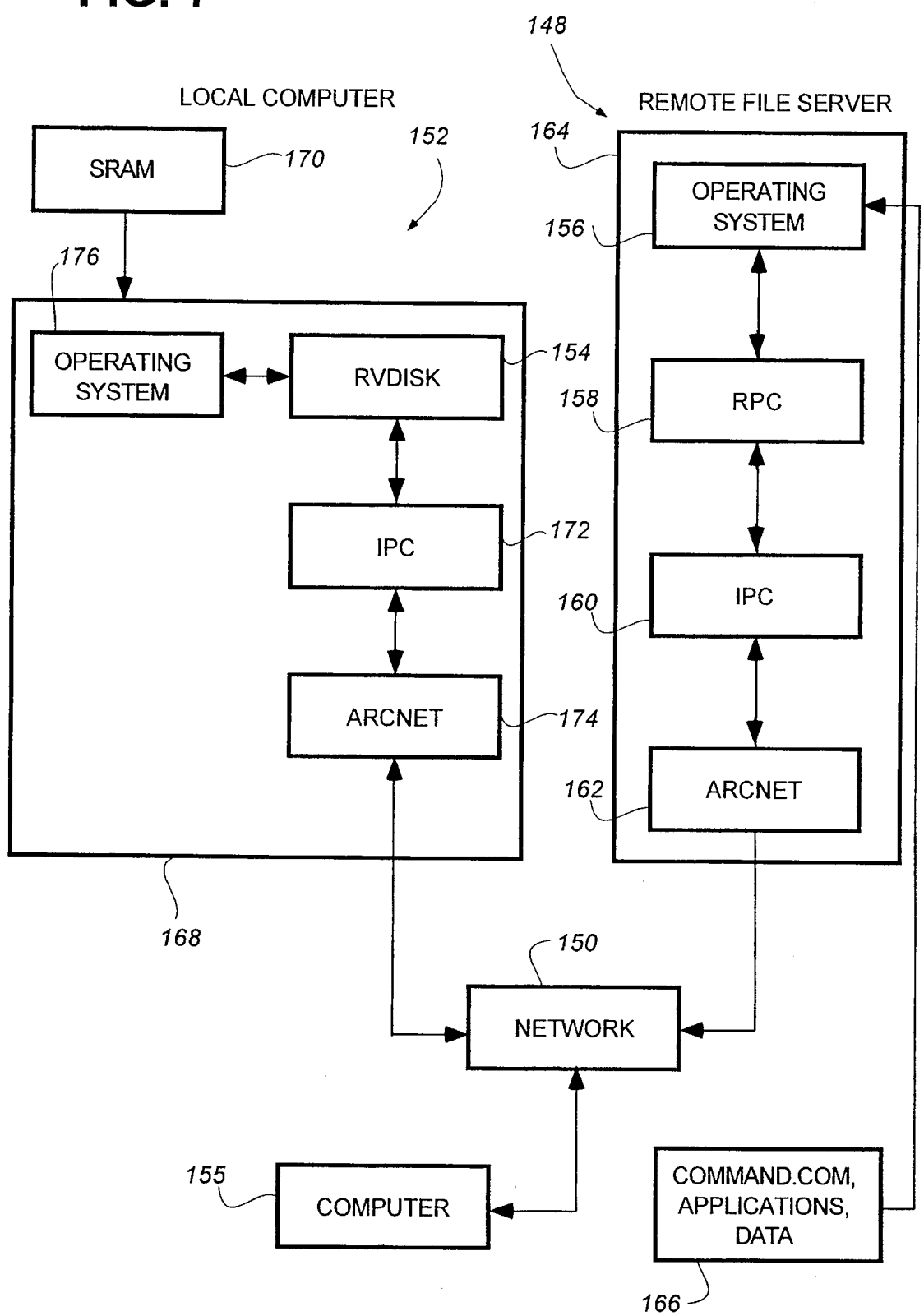
FIG. 7 is a block diagram of an implementation of a remote virtual disk in a distributed data processing system.
Figure 8:
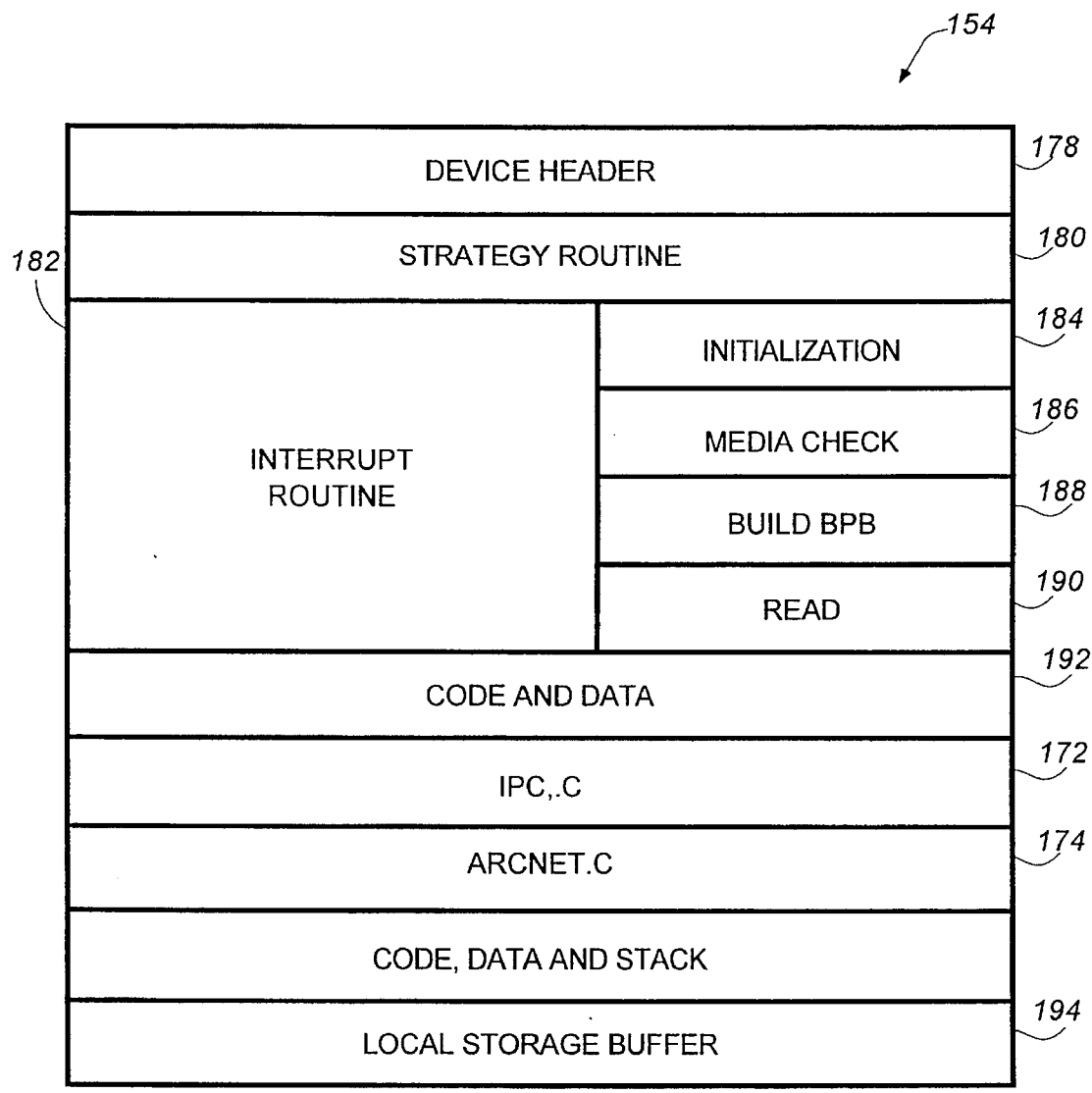
FIG. 8 is a block diagram of a remote virtual disk block device driver.

Referring to FIGS. 7 and 8, RVDISK device driver 154 is loaded and initialized by local computer 152 in accordance with the following procedure, in which it is assumed that remote file server 148 is already up and running:

1. Local computer 152 is turned on, and in accordance with its standard programming performs an initial boot-up from secondary storage 170, loading the boot block into primary storage 168 from secondary storage 170.

2. The loaded boot block reads the CONFIG.SYS file also resident on secondary storage 170.

3. The CONFIG.SYS file command line "device=rvdisk" is executed, causing MS-DOS® operating system 176 to load RVDISK device driver 154 which is also resident on secondary storage 170.

4. MS-DOS® operating system 176 calls the strategy routine 180 and passes to it the address of the request header in the ES:BX registers.

5. RVDISK device driver 154 saves the address of the request header and returns processor control to MS-DOS® operating system 176.

6. MS-DOS® operating system 176 calls interrupt routine 182 with a command code for initialization routine 184.

7. Interrupt routine 182 saves the registers, creates a local stack and calls initialization routine 184.

8. Initialization routine 184 then copies the boot sector (Sector 0) from remote file server's 148 secondary storage device 166. The copied boot section is stored in local computer 152 in a buffer 194 located in memory at end of RVDISK device driver 154. In connection with this process, initialization routine 184 calls IPC 172, which in turn calls ARCNET 174, which performs the actual communication (via network 150) with remote file server 148.

9. Initialization routine 184 then copies the BPB contained in the boot sector residing in the local buffer into a local BPB structure, places the break address in the request header, places the address of the BPB structure in the request header, places the number of logical units (equal to one in the preferred embodiment) in the request header, and finally returns to MS-DOS® operating system 176.

10. MS-DOS® operating system 176 calls interrupt routine 182 with a command code for media check routine 186.

11. Interrupt routine 182 saves the registers, creates a local stack and calls media check routine 186.

12. Media check routine 186 then sets the media changed code to "media not changed," and returns to MS-DOS® operating system 176.

13. MS-DOS® operating system 176 calls interrupt routine 182 with a command code for build BPB routine 188.

14. Interrupt routine 182 saves the registers, creates a local stack and calls build BPB routine 188.

15. Build BPB routine 188 then copies from the locally stored boot sector (which was copied from secondary storage 166 above) into a data structure (the "local BPB") resident on local computer 152. Build BPB routine 188 then places a pointer to the local BPB into the request header and returns to MS-DOS® operating system 176.

After local computer 152 completes the foregoing steps, RVDISK device driver 154 will be initialized and MS-DOS® operating system 176 will have all the parameters required to use RVDISK device driver 154. Local computer 152 then loads those portions of MS-DOS®operating system 176 (specifically, COMMAND.COM) not resident in secondary memory 170, along with application programs and data. The exact contents of the application code and data necessarily depends on the nature of the particular environment in which the invention is practiced.

In the preferred embodiment, the process by which local computer 152 loads COMMAND.COM and application programs and data is:

(1) MS-DOS® operating system 176 searches the local BPB to determine which sectors on secondary storage device 166 contain the FAT and root directory information.

(2) MS-DOS® operating system 176 calls interrupt routine 182 with a command code for Read routine 190.

(3) Interrupt routine 182 saves the registers, creates a local stack and calls Read routine 190.

(4) Read routine 190 then calls a subroutine passing the following parameters: starting sector number, number of sectors and destination buffer address. The subroutine requests one sector at a time from secondary storage 166. These requests are sent through network 150 via IPC 172 and ARCNET 174 resident on local. These requests are then processed by IPC 160 and ARCNET 162, and RPC 158 resident on remote file server 148. The requested information is returned to local computer 152 via the foregoing pathway.

After the FAT and root directory information has been retrieved from remote file server 164, MS-DOS® operating system 176 forms additional requests to RVDISK device driver 154 for the sectors in secondary storage 166 which contain actual application programs and data. Steps 2 through 4 above are repeated until all of the application programs and data in secondary storage 166 have been copied.

After the completion of the foregoing steps, local computer 152 will have loaded in its main memory operating system programs, application programs and data from secondary storage device 166. In the preferred embodiment, polling routine 106, layered software 66 and interrupt routines 134 are also loaded from secondary storage 166. RVDISK 154 is not used again until local computer 152 is reinitialized. In the illustrated embodiment, the centralized storage of portions of MS-DOS®, application programs and data on remote computer 148 guarantees that each local computer 152 will be running the same (and most recent) operating system, application programs and data.

While the invention has been described with respect to certain preferred embodiments, it is to be understood that the invention is capable of numerous changes, modifications and rearrangements without departing from the invention as defined in the following claims.

What is claimed is:

1. A distributed data processing system, comprising:
   (a) network means for enabling electronic communication;
   (b) a plurality of computers, each of which comprises a processor, a memory and a plurality of peripheral devices;
   (c) layered software means for enabling each of said plurality of computers to send and receive data, procedure calls and function calls through said network means, said layered software means residing in the memory of each of said plurality of computers and including remote procedure calling software means for creating a request block to service a request from one of said peripheral devices;
   (d) a plurality of predetermined computer procedures located in said memories of said computers for processing data inputted from said plurality of peripheral devices and means for enabling each of said procedures to call said layered software means;
   (e) polling software means residing in the memory means of each of said plurality of computers for successively polling said plurality of peripheral devices attached to said computer to determine whether a request is pending from said peripheral device and said computer including means for servicing said request, prior to said computer polling its next peripheral device, by calling a procedure located in said memory of said computer or, when said computer does not have the procedure in its memory by calling said remote procedure calling software means to request another of said computers to call a procedure located in the memory of that computer to service said request prior to polling the next peripheral device; and
   (f) processing means, comprising the processor of each of said computers, for processing input data from said peripheral devices, said processing means being controlled by said layered software means and said polling software means;
   wherein each said plurality of peripheral devices includes at least one interface adapter as one of said peripheral devices for electronically connecting said processing means to said network means.

2. A distributed data processing system according to claim 1 wherein said processing means in at least one of said plurality of computers is a single-task processor.

3. A distributed data processing system according to claim 2 wherein said plurality of predetermined computer procedures are located at predetermined addresses in said memory of each of said computers.

4. A distributed data processing system according to claim 3 wherein at least one of said plurality of computers includes:
   (a) timer means for generating a time signal;
   (b) task queue memory means for storing one or more records, each comprising the address of one of said procedures and a predetermined value corresponding to a time;
   (c) indication means responsive to said timer means for indicating when one of said records contains a predetermined time which is equal to the time signal;
   (d) means responsive to said polling means for calling one of said procedures as indicated by said indication means; and
   (e) wherein said polling means polls said indication means.

5. A distributed data processing system according to claim 3 wherein said layered software means resident on each one of said plurality of computers comprises:
   (a) application program interface software means for assembling and processing a plurality of request blocks;
   (b) system program interface software means for transmitting and receiving said request blocks through said network means; and
   (c) device control interface software means for controlling said network means; and
   (d) wherein each of said predetermined procedures on one of said plurality of computers is able to transmit data over said network means from a first on of said plurality of computers to a second one of said plurality of computers by calling said first computer's application program interface software means, said data then being passed to said first computer's system program interface software means, then to said first computer's device control interface software means, then to said network means, then to said second computer's device control interface software means, then to said second computer's system program interface software means and then to said second computer's application program interface software means.

6. A distributed data processing system according to claim 3 further comprising a table representing said procedures comprising a plurality of records, each of said records including a unique procedure designator and a corresponding predetermined procedure address, and wherein said layered software means comprises means for looking up in said table a particular one of said procedure designators and calling that one of said procedures at said procedure address corresponding in said table to said particular procedure designator, each of said plurality of computers capable of requesting another one of said plurality of computers to execute a specific one of said plurality of procedures by passing said other computer via said layered software means the procedure designator corresponding to said specified procedure.

7. A distributed data processing system according to claim 1 wherein said polling means runs continuously on each of said plurality of computers.

8. A distributed data processing system according to claim 7 wherein at least one of said plurality of computers further comprises a flag which when polled by said polling means informs said polling means that said input data is waiting.

9. A distributed data processing system according to claim 8 wherein at least one of said plurality of computers further comprises a buffer for receiving said input data from one of said plurality of peripheral devices.

10. A distributed data processing system according to claim 9 wherein said flag and said buffer are located on said interface adapter of said one of said plurality of computers.

11. A method of distributed data processing among a plurality of computers comprising the steps of:
    (a) electronically connecting each of said computers to network means for electronic communication;
    (b) electronically connecting each of said computers to a different plurality of peripheral devices, each said plurality of peripheral devices including at least one network interface adapter as one of said peripheral devices for receiving requests from the other computers over the network means;

(c) on each computer, interrupting processing whenever one of its respective peripheral devices has a request, said interrupt causing a flag corresponding to said peripheral device to be set in said computer's memory;

(d) each said computer successively polling each of its respective peripheral devices by checking the status of said flag corresponding to each said peripheral device to determine if any requests are pending and servicing by one of said computers such requests if encountered;

(e) on each of said computers, if said pending request requires execution of a function resident on said computer, executing said function prior to polling the next peripheral device;

(f) on each of said computers, if said pending request requires execution of a function resident on another of said computers, calling remote procedure calling software means for creating a request block to service said request prior to polling the next peripheral device; and (g) on each said computer, if a request is from said network interface adapter, calling remote procedure handling software means to service said network request prior to polling the next peripheral device.

12. A method of distributed data processing according to claim 11 further comprising the steps of:

(1) placing into each of said computers' memory a table of procedures for operating one or more of said peripheral devices, said table comprising a plurality of records, each of said records including a unique procedure designator and a corresponding procedure address;

(2) after step (f) of claim 11, if said pending request requires remote execution of a procedure, passing one or more of said plurality of procedure designators to said remote procedure calling software means for inclusion in said request block;

wherein each of said plurality of computers requests another one of said plurality of computers to execute a specific one of said plurality of procedures by passing the procedure designator corresponding to said specified procedure when said specified procedure does not reside in said requesting computer's memory but resides in said other computer's memory.

13. In a network of computers, at least one of which is single-tasking, a method for simulating multi-tasking comprising the steps of:

(a) electronically connecting each of said computers to network means for electronic communication;

(b) electronically connecting each of said computers to a different plurality of peripheral devices, each said plurality of peripheral devices including at least one network interface adapter as one of said peripheral devices for receiving requests from the other computers over the network means;

(c) each said computer successively polling its respective peripheral devices to determine if a request is pending and servicing the request by one of said computers;

(d) on each of said computers, if said pending request requires execution of a function resident on said computer, executing said function prior to polling the next peripheral device;

(e) on each of said computers, in response to a request from one of said peripheral devices requiring execution of a function resident on another of said computers, calling remote procedure calling software means for creating a request block to service said request prior to polling the next peripheral device; and (f) on each of said computers, in response to a request from said network interface adapter, calling remote procedure handling software means to service said network request prior to polling the next peripheral device.

* * * * *